US009232293B1

(12) United States Patent
Hanson

(10) Patent No.: US 9,232,293 B1
(45) Date of Patent: Jan. 5, 2016

(54) HEADPHONE AUTHENTICATION MODULES

(75) Inventor: Robert Hanson, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 774 days.

(21) Appl. No.: 13/495,609

(22) Filed: Jun. 13, 2012

(51) Int. Cl.
H04R 1/10 (2006.01)
H03G 9/00 (2006.01)

(52) U.S. Cl.
CPC .................... H04R 1/1041 (2013.01)

(58) Field of Classification Search
CPC ... H04R 1/1008; H04R 1/1016; H04R 1/1041
USPC .......... 381/111, 309, 74, 370, 384, 122, 375; 455/569.1, 575, 575.6; 379/430
See application file for complete search history.

(56) References Cited

U.S. PATENT DOCUMENTS

| | | | | | |
|---|---|---|---|---|---|
| 7,283,635 | B1* | 10/2007 | Anderson | ............... | H04M 1/60 381/384 |
| 7,623,667 | B2* | 11/2009 | Sander | ................... | H04M 1/05 381/384 |
| 8,498,427 | B2* | 7/2013 | Yang | ................... | H04R 1/1041 379/430 |
| 2009/0281809 | A1* | 11/2009 | Reuss | ..................... | G10L 17/24 704/273 |
| 2011/0107415 | A1* | 5/2011 | Shen | ..................... | G06F 21/445 726/19 |
| 2013/0044231 | A1* | 2/2013 | Chuang | ................... | H04R 3/00 348/211.4 |

OTHER PUBLICATIONS

International Journal of Scientific and Research Publications, vol. 2, Issue 4, Apr. 1, 2012 ISSN 2250-3153.*

* cited by examiner

Primary Examiner — Xu Mei
Assistant Examiner — Ammar Hamid
(74) Attorney, Agent, or Firm — Novak Druce Connolly Bove + Quigg LLP

(57) ABSTRACT

Audio components such as headsets or earbuds can include a control module that stores an identifying code. When an audio component is connected to an electronic device, the device determines the code and can set certain parameters (e.g., audio playback volume) and/or provide at least some level of access to functionality and data. The control module also includes one or more buttons that enable a user to provide an input sequence that can act as a personal code. When the electronic device receives the personal code and verifies that the code is associated with the identifying code of the audio component, the electronic device can provide access to additional and/or all functionality on the device, and any or all data stored for the user or device. The sequence can correspond to a beat pattern or musical sequence entered using the buttons.

22 Claims, 5 Drawing Sheets

HEADPHONE AUTHENTICATION MODULES

BACKGROUND

Portable electronic devices have become extremely popular for activities such as listening to music, watching movies, and playing games. Many of these activities include sound or audio portions. When a user is in a location such as a plane or a library, the user might not want the sound or audio to be heard by others. Accordingly, a user often uses headphones, earbuds, or other such audio components to listen to audio from various devices in at least some situations. In many cases, a user must frequently adjust the volume when the user wants to listen to audio using one of these audio components. Further, when a user is listening to the audio through a device such as a smart phone or tablet that might have sensitive data or protected functionality, the user must enter a lock code or other authorization mechanism on the device to access that data or functionality. When the device is in the user's pocket or another such location, having to continually pull out the device and enter a code to access data or functionality can be frustrating for the user. The user has the option of not locking the device, but such an approach risks exposure of the sensitive data and/or functionality.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to providing access to, and/or interacting with, an electronic device. In particular, various embodiments utilize a "unique" identifying code contained in control module for a headphone or similar audio component to provide a first level of authentication of a user. When a user plugs a specific set of headphones into a computing device, the computing device can obtain the code from the control module and, if the code is recognized, can adjust a volume, select a corresponding playlist, or otherwise provide a first level of settings and/or access to the device based on the code. Further, the user can have the ability to enter a personal code using one or more buttons or other inputs of the control module. The computing device can receive this personal code and, if the personal code matches information stored for the identifying code from the control module, a second level of access can be provided to the user. For example, entering a personal code on a control module having a recognized identifying code can unlock the computing device and/or enable the user to obtain full access to the computing device. In at least some embodiments, the user can access user profile information or user content from any appropriate computing or electronic device where the user is able to plug in the headphones and control module, and were the device is able to either locally authenticate the user or access a system or service that is configured to authenticate the user and provide access to the user profile information, content, etc. Further, the remote system or service can provide access to personalized content (e.g., music, videos, photos, shopping settings, personalized ads, user device controls, etc.) through the device when the identity of a user is authenticated using such a multi-factor authentication approach (e.g., the identifying code from the earbuds plus the personalized code entered by the user).

Various other functions and advantages are described and suggested below as may be provided in accordance with the various embodiments.

Figure 1:
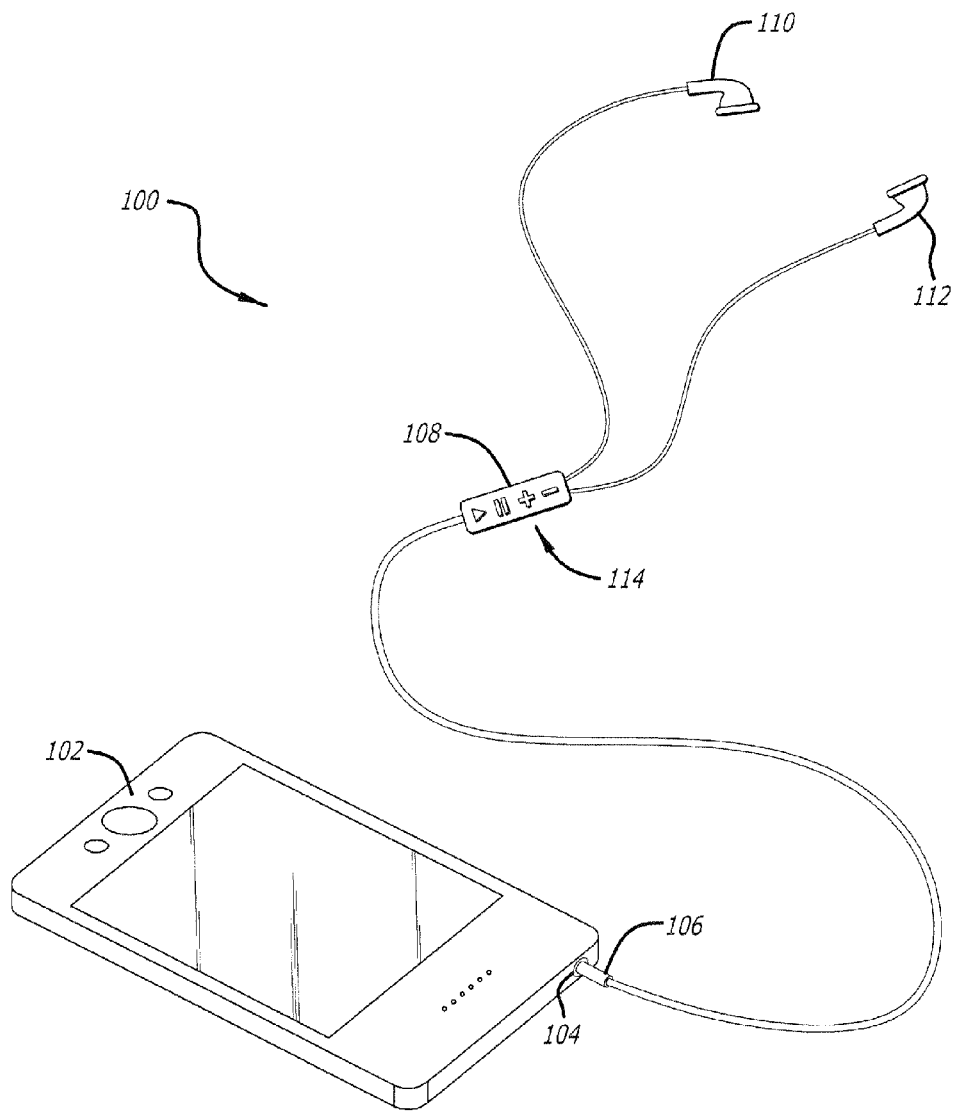
FIG. 1 illustrates a set of earbuds with a control module for controlling functionality of a computing device that can be utilized in accordance with various embodiments.

FIG. 1 illustrates an example configuration 100 that can be utilized in accordance with various embodiments. In this example, a user can utilize a computing device 102 to access content such as audio, video, or gaming content. Although a portable computing device (e.g., a smart phone, tablet computer, or electronic book reader) is shown, it should be understood that any appropriate electronic device can be used as well, as may include a desktop computer, a notebook computer, a portable media player, a video game console or controller, a smart television, a set-top box, and the like. The computing device can include at least one jack 104 or other input mechanism enabling a plug 106 of a set of earbuds or headphones to be "plugged into" the device. As should be understood, in at least some embodiments a wireless connection can be utilized alternatively, or in addition to, such a physical connection. In this example the headphones include a pair of earbuds 110, 112 for stereo playback, but it should be understood that other types of audio component or personal speaker can be used as well, and in at least some embodiments only a single earbud or personal speaker might be provided for mono or similar playback.

In this example, the headphones also include a control module 108 (or dongle, adapter, component, etc.) that enables a user to provide input to the computing device 102, particularly as relates to an aspect of audio playback. The control module can take any of a number of forms, and can have any appropriate number of buttons 114 or other such inputs. In this particular example, the buttons 114 of the control module 108, when pressed by the user, cause the control module to send instructions to the computing device 102 to perform actions such as to increase or decrease a playback volume, play audio, stop audio, pause audio, skip to a different track, etc. The control module can include circuitry, as may be contained on a circuit board or chip inside the control module, for example, for generating the appropriate signal in response to a button press or other such input.

The control module 108 can also include memory (e.g., ROM, flash, a hardware register, etc.) that enables the control module 108 to store a code that is likely to be unique to that control module, or at least found in few control modules. In at least some embodiments, this "unique" code is an alphanumeric code that is determined by a manufacturer of the control module and provided to the control module during manufacture. The code can have any appropriate length, such as 16 or 32 characters or bytes in length, such that the number of combinations likely will exceed the number of control modules created, enabling each control module from a particular manufacturer to contain a unique code, at least with respect to other control modules from that manufacturer. Various other types and lengths of code can be used as well within the scope of the various embodiments.

When the plug 106 is inserted into the jack 104 of the computing device, the computing device can cause an appropriate voltage or signal to be sent through the plug to be received by the circuitry of the control module 108. The voltage or signal can be selected such that a user wearing the earbuds 110, 112 will not be able to hear the transmission. When the control module 108 receives the signal from the computing device, the control module can return a signal or signal pattern that corresponds to the unique code contained in the memory of the control module. The computing device 102 can contain software that is configured to determine the unique code from the signal, and use that unique code to attempt to identify information about that control module. In at least some embodiments, the computing device can first check local memory to see if information associated with that unique code is stored by the device. If not, or in addition, the computing device can send a request to a remote system or service to attempt to obtain information associated with that unique code. In at least some embodiments, the information associated with the code can include identifying information for the user, preferences for the user, capability information for the headphones (e.g., mono or stereo, dynamic range, noise canceling capabilities, and the like), and other such information. In at least some embodiments, when the user plugs in a set of headphones and the unique code of the control module is recognized by the computing device (either directly or indirectly), the computing device can determine the appropriate volume setting for those headphones and can set the volume automatically. The volume might be a volume setting specified by the user, a last volume setting for those headphones on that device, a volume setting for those headphones last used for the current activity, or another such setting. The setting information can be unique to the device, or can be a global setting for those headphones and/or that user.

Further, the computing device might make one or more other adjustments as well. For example, if the headphones are associated with a user and that user has content that is not protected, the device might provide the user with direct access to that content. For example, if the user has a playlist on the device the device might switch to the user's playlist when the user plugs in the headphones. In at least some embodiments, the device can provide the user with access to any functionality that might be provided if the user unlocked the phone using a standard gesture, such as a swipe or button press. In some embodiments the device can also act as if the user has entered a personal identifier, such as a PIN, signature, or biometric data, when the unique code is received, but such an approach enables any person having access to the headphones to be able to access the unlocked state of the device.

Accordingly, approaches in accordance with various embodiments can also enable the user to provide a personal code through the control module that, when used in combination with the unique code of the control module, can more accurately and securely authenticate the user. In fact, the use of two separate codes from two distinct sources can allow for a multi-factor authentication (MFA) of the user. For example, the user can plug in a headset to provide the unique code, and can enter a specified sequence using the buttons 114 on the control module 108 to provide the personal code. When the computing device receives the personal code, the computing device can determine whether the personal code matches a personal code associated with the unique code (as may be stored locally or remotely), and if so can function as if the user had unlocked the device, or can at least provide the user with access to additional functionality or data on, or via, the device. As discussed, this can include access to data or content that is stored remotely, such as by a remote system or service, and accessible via the device. For example, a user's identity may be authenticated for online or network activity, in addition to device access, using the multi-factor authentication of the audio-component code in concert with the correct user-provided personal code. In other words, the personal code with the known audio component code can be sufficient to authenticate the user to at least certain providers, such as a cloud provider capable of storing user content such as videos, music, photos, shopping settings, and personalized advertisements. The content also can provide device control, such as controls for a user's home (e.g., lights and thermostats), office, car (e.g., ignition and heat), etc., as discussed elsewhere herein.

Instead of forcing the user to have to remember yet another sequence or passcode, such as right-up-down-down-left-up, using the appropriate buttons, approaches in accordance with various embodiments can enable users to utilize beat patterns, song snippets, sounds bytes, or other such patterns to provide a unique code that is easier for the user to remember. For example, the user might have a favorite song that has a unique riff, drum pattern, or melody. If each button is associated with a different tone or sound, the user can be able to "play" a memorable portion of that song using those buttons. In this way, the user can easily remember the personal identifier as the user just has to play that song portion or beat pattern again. Some users might prefer to create their own beat patterns, which can be easy for the user to both remember and enter into the control module. Humans quickly adapt and respond to musical notes, and typically can remember far longer sequences of musical notes than numerical sequences. By allowing users to play music using buttons of an in-line control module, the length of the passcode can be increased despite the range of values decreasing. The control module can cause the appropriate notes or sounds to be played through the headset (or device) as the user is pressing the buttons, such that the user can determine that the correct code is being entered. The set of button presses plus the presence of a code indicating the headphones are associated with the user can provide a strong authentication that can be easily remembered and typed by a user, silently, without removing the computing device from a user's pocket or other such location. Such an approach also can allow for additional commands and experiences to be elicited from the computing device without the user having to access the device.

Timing information for the code can also be utilized to further improve the security, as well as to allow for variation in user entry. For example, a code might not include only the sequence of eight button presses, but also the relative times at which those buttons are pressed and/or the amount of time that each is pressed. For example, if there is a long pause between the fourth and fifth button presses, the personal code in some embodiments would only be accepted as correct if there is an appropriate pause at that location in entry, regardless of whether the sequence of button presses is correct. Further, the timing can be relative such that a beat pattern can be played quickly or slowly, or with different tempos at different times, and the system can recognize the code as correct as long as the relative timing is appropriate (within an allowable amount of deviation) for the current tempo. Thus, if a user is in a hurry and enters the sequence more quickly than normal, the device can still accept the code and provide access as appropriate.

Figure 2A:
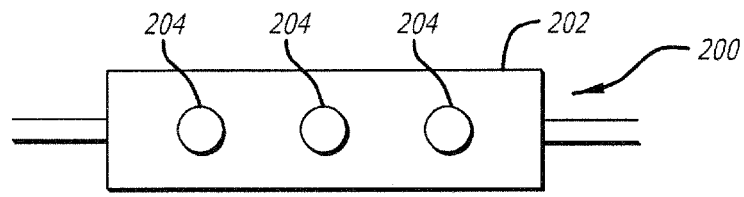
FIGS. 2(a), 2(b), 2(c), 2(d), and 2(e) illustrate views of example control modules that can be utilized in accordance with various embodiments.
Figure 2B:
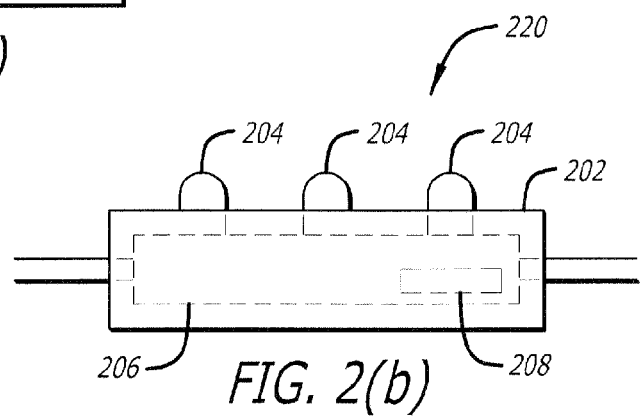

FIGS. 2(a) through 2(e) illustrate various views of control modules that can be used in accordance with various embodiments. For example, FIG. 2(a) illustrates a top view 200 of a first control module, where a rectangular housing 202 includes a set of three buttons 204 on one side of the housing. The housing and buttons can each be made of a material such as plastic or a hard rubber, for example, and each of the buttons 204 can have an appropriate shape and associated function, which might vary based on the current activity or as specified by the user, among other such options. FIG. 2(b) illustrates a side view of the same control module, where the buttons 204 are shown to be connected to a circuit board 206 contained within the control module housing 202. The circuit board can be a printed circuit board (PCB) or chip in at least some embodiments, where circuitry on the board enables a signal to be generated when any of the buttons are pressed, where that signal can be sent to a computing device into which the plug of the control module is connected. The circuitry also can be configured to receive one or more types of voltages or signals from the computing device, and determine an appropriate response. For example, the board might include a memory chip, register, or other such memory element 208 that stores a unique identifying code for the control module. In response to the control module receiving a request or other such signal from the computing device, the circuitry can read the identifying code from the memory element 208 and provide an appropriate signal for the code to the computing device, such as by pulsating at the appropriate times and/or frequencies. The computing device can determine the code of the computing module from the signal. Various components can be used with such a PCB or chip as well, as is known in the art for managing input and output for electronic devices.

Figure 2C:
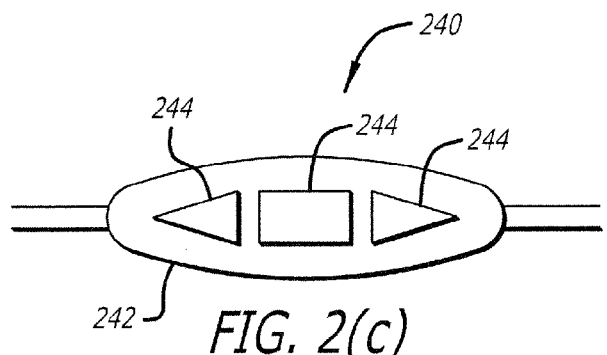
Figure 2D:
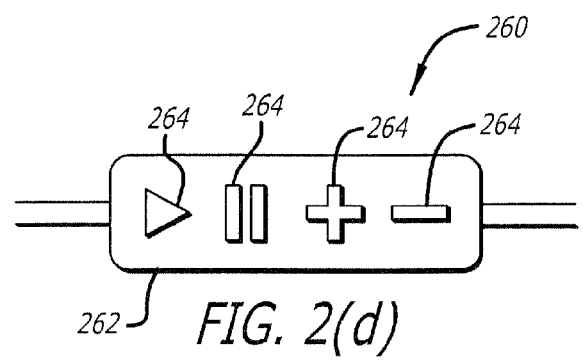
Figure 2E:
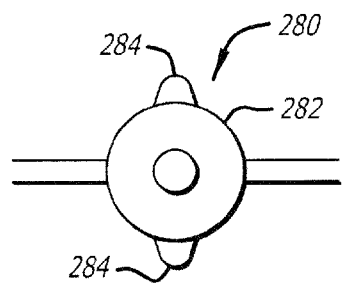

FIGS. 2(c) through 2(e) illustrate views of alternative control module devices. For example, in the view 240 of FIG. 2(c) the module has a housing 242 with a slightly rounded shape and three buttons 244, which enable a user to perform various actions with respect to the headphones, as well as to enter a personal code. The view 260 of FIG. 2(d) illustrates an example housing 262 with four distinct buttons 264, which enable a user to perform actions such as to play or pause audio, as well as to increase or decrease the volume of the audio playback. Other input can be provided using these buttons as well, as may depend at least in part upon the context, user, computing device, etc. The view 280 of FIG. 2(e) illustrates an example housing 282 where the housing is rounded and buttons 284 are located on multiple sides, angles, or portions of the housing. Various other configurations can be utilized as well within the scope of the various embodiments.

Although the control modules are all shown to be in-line with the headphones, or physically connected along wires between the earbuds and the plug, for example, it should be understood that in at least some embodiments the control module might be a separate component. For example, the user might plug a pair of headphones into a control module, and plug the control module into the electronic device, in order to allow headphones that do not otherwise have a unique code to take advantage of various functionality described herein.

Figure 3:
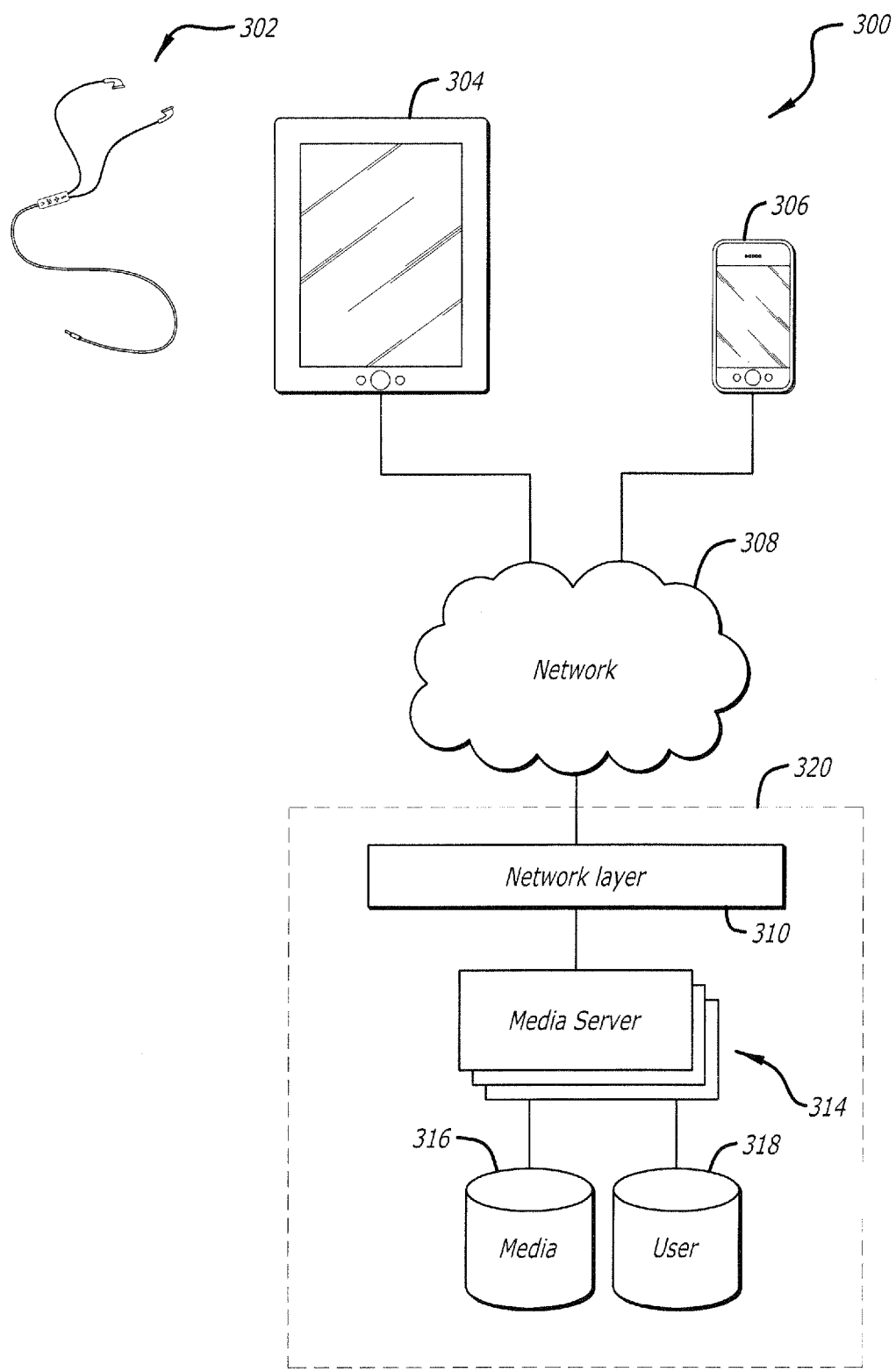
FIG. 3 illustrates components of an example system for enabling user profile information to be accessed from multiple devices that can be utilized in accordance with various embodiments.

As mentioned, in at least some embodiments information associated with a user and/or pair of headphones can be accessed from multiple devices. For example, FIG. 3 illustrates an example environment 300 wherein a user has a pair of headphones 302 with a control module that includes an identifying code. The user can plug those headphones into at least two electronic devices 304, 306 that might each belong to the user or another entity. As long as the devices are able to determine and verify the identifying code, the code can potentially be used to authenticate the user to either device. For example, the user might plug the headphones into a first device 304, which can obtain the code from the control module of the headphones as discussed elsewhere herein. The device 304 might have information stored locally on the device, or might be able to send a request across at least one appropriate wired and/or wireless network 308, such as the Internet or a cellular network, to a system (or service) operable to authenticate the user using the identifying code. For example, the device 304 might send an authentication request with the identifying code to a media provider system 320, where the request is received to a network layer (including elements such as Web servers, routers, and other such components) and then directed to a component such as a media server 314. Various other components can be used as well as is known for receiving and processing requests. In this example, the media server can compare the identifying code against information stored in a location such as a user data store 318, and can determine whether the code is recognized, as well as whether the code corresponds to a user, a valid account, etc. If the code is recognized, and the user has an account with the media provider, the media server can enable the computing device to access media content stored by the media provider. For example, if the user has purchased rights to a number of songs or videos stored in a media data store 316 or other such location, the media provider system can enable the user to access that content using the device 304 as long as the control module of the headphones is plugged into the computing device 304, or until another designated stop event occurs. If the user subsequently plugs the headphones 302 into the other device 306, a similar process can enable the user content to be accessible through the second device.

In at least some embodiments, the user might also have to enter a personal code using the control module, and the personal code might have to be validated for the identifying code of the headphones. A user might obtain access to a first type of content with the identifying code, and then a second type of content with the addition of the personal code. Further, the system or service authenticating the user can be any appropriate system or service, and does not have to be associated with providing or serving media or other such content. Further, separate systems might be used to authenticate the user and then to provide access to content or functionality, where those systems might be owned by separate entities. Various other approaches can be used as well within the scope of the various embodiments.

Figure 4:
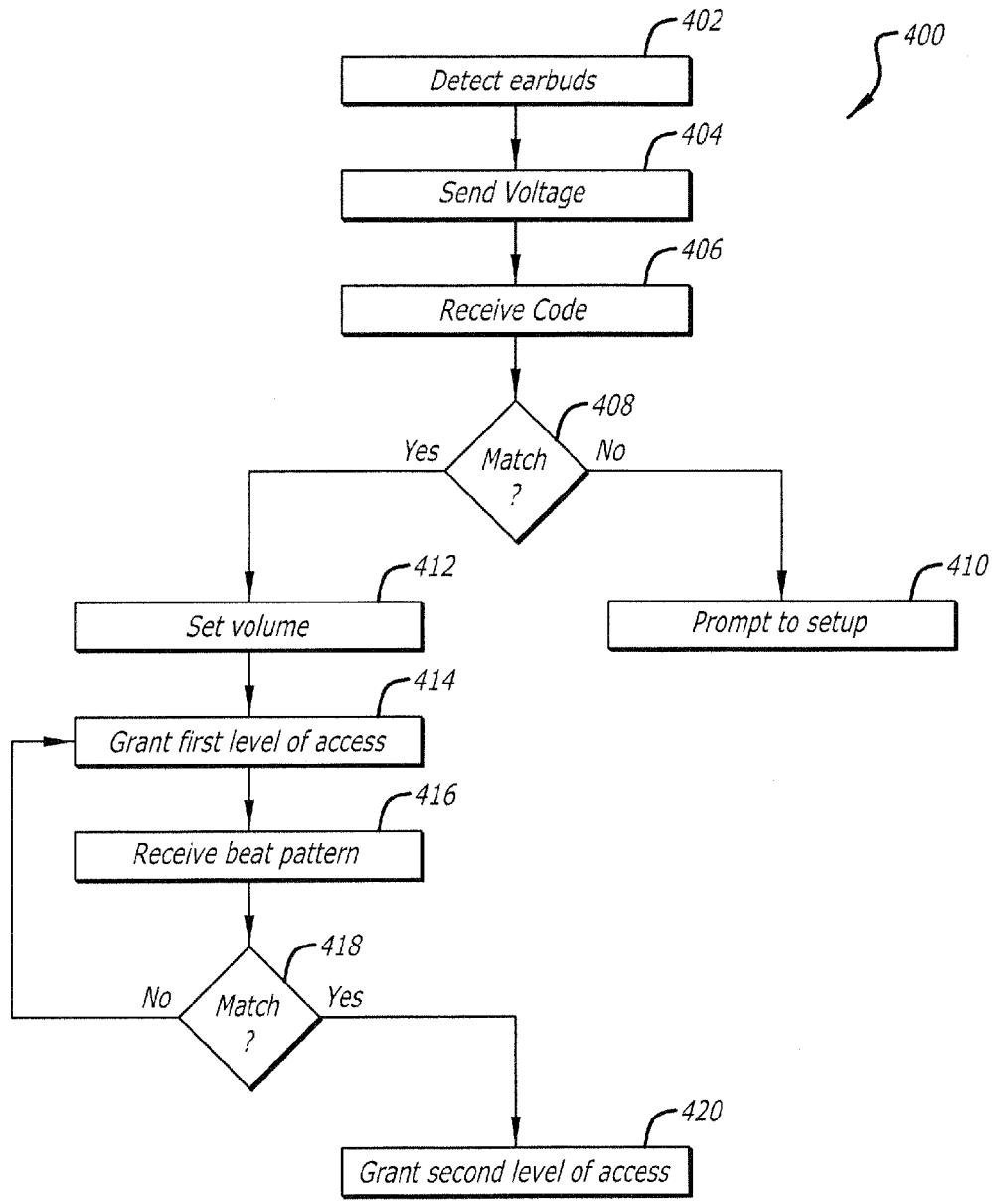
FIG. 4 illustrates an example process for enabling access to a computing device using a headphone control module that can be used in accordance with various embodiments.

FIG. 4 illustrates an example process 400 for providing a user with access to a computing device that can be utilized in accordance with various embodiments. It should be understood that there can be additional, fewer, or alternative steps performed in similar or alternative orders, or in parallel, within the scope of the various embodiments unless otherwise stated. In this example, earbuds (or similar optical elements) are detected 402 to be connected to the computing device. As discussed, this can involve a plug of the earbuds being plugged into a jack of the device, or another such connection being established. In this example, the computing device upon detecting the earbuds can send 404 a voltage or other signal to a control module of the earbuds, and if the earbuds contain a control module that includes a unique code or other such identifier, the unique code can be received 406 from the control module, such as in the form of a coded signal. A determination can be made as to whether the received code matches 408 a stored earbud code, and if not the computing device can perform an action such as to display a prompt 410 on a display screen to ask the user to setup the earbuds with the computing device. If no code is received from the earbuds, no action might be taken.

In this example, a determination that the unique code of the earbuds matches a code stored by (or for) the computing device can cause certain actions to be taken. For example, a volume setting can be determined that is associated with that unique code, such as the volume setting the last time those earbuds listened to audio through the device, and the device volume can be set 412 to that level. In addition, the user might be granted 414 a first level of access to the device. For example, the user might be able to access songs or videos one the device, and perform certain actions, based at least in part upon the unique code being recognized. Other types of access can be granted as well.

Subsequent to the earbuds being plugged into the device, the computing device can receive 416 a signal including information for a beat pattern or musical pattern entered into the control module by the user. The computing device (or a remote device) can analyze the beat pattern to determine whether the pattern matches 418 a beat pattern associated with the unique pattern of the control module. As discussed, matching can include not only the proper sequence of button presses, but a relative timing of the button presses as well, among other potential aspects. If the beat pattern does not match a pattern associated with the unique code, the current level of access can continue to be provided to the user. In at least some embodiments the computing device can communicate to the user that the beat pattern was not recognized, either directly or through the earbuds. If the beat pattern matches within an allowable amount of deviation, for example, a second level of access can be granted 420 on the computing device. As discussed, this can involve unlocking all the functionality on the device as if the user had entered an unlock code, or at least providing additional access that was not provided upon the user plugging the earbuds into the device. Various other approaches can be used as well within the scope of the various embodiments.

Figure 5:
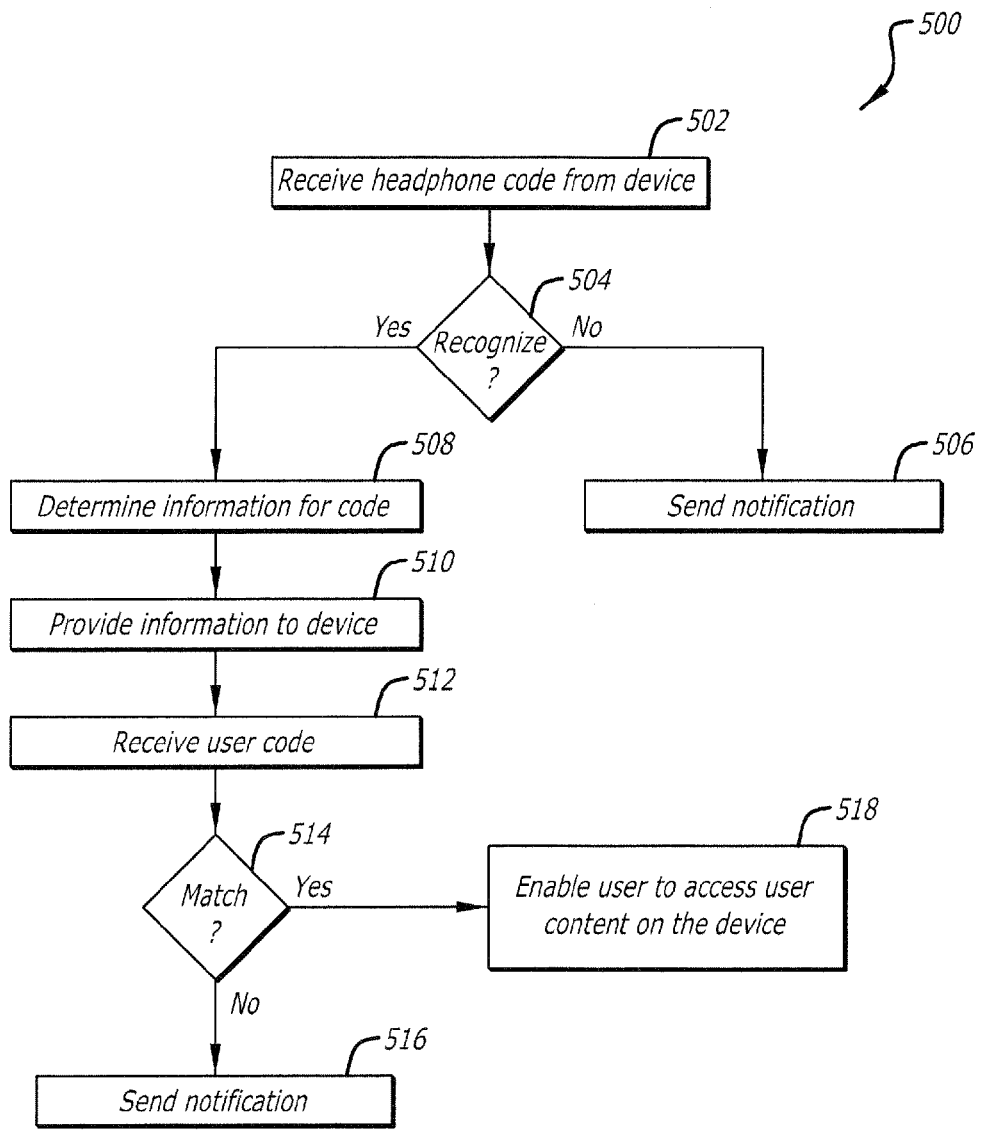
FIG. 5 illustrates an example process for enabling a user to access user content from various devices that can be utilized in accordance with various embodiments.

FIG. 5 illustrates another example process 500, in this case enabling multiple devices to access user content or information in accordance with various embodiments. In this example, a headphone code is received 502 from an electronic device. The device can be any appropriate device, and in at least some embodiments might not ever previously have been associated with the headphones providing the code. The electronic device can obtain the headphone code from a control module of a pair of headphones as discussed elsewhere herein. The code can be received to an appropriate device, system, or service as also discussed elsewhere herein. A determination can be made as to whether the headphone code is recognized 504, such as whether the code was previously stored and associated with a user or account. If not, a notification can be sent to the electronic device that the code was not recognized, and the device can take an appropriate action, such as to ask whether the user wants to have those headphones associated with the user, a specific account, etc.

If the headphone code is recognized, information associated with the headphone code can be determined 508, such as by determining volume settings, user information, account data, and the like. At least some of this information can be provided 510 to the electronic device, which can act upon the information as appropriate. For example, the device might adjust a volume setting or grant a certain level of access to the device in response to the headphone code being recognized.

Subsequent to the headphone code being recognized, a user code can be received 512 from the computing device. As discussed, the user code can correspond to a beat pattern or musical sequence entered by a user into a control module of the headphones, or other such information. A determination can be made as to whether that user code matches 514 a stored user code that is associated with the headphone code, or a user or account associated with the headphone code, etc. If not, a notification can be sent 516 to the device indicating that the code was not recognized, such that the electronic device can notify the user or take another such action. If the user code does match a stored code, access to user content stored on, or remote to, the device can be provided 518 to the electronic device. As discussed, additional functionality or access can be provided as well within the scope of the various embodiments. Such an approach enables a user to essentially take a profile with the user and access information associated with that profile using the unique code embedded in the control module of the headphones, as well as any personal code of the user. The device might not just be a computer or media player, but could be a device like a home audio system, a car navigation system, etc.

In addition to using the same headphones with multiple devices, a user can also use multiple headphones with a single device. For example, the user might have everyday earbuds that the user typically uses, and might have noise-canceling headphones that the user uses on planes or in certain environments. Each of these headphones can have a unique code that is associated with the user, and when the user plugs either of these headphones into the device, the device can automatically adjust the volume to a volume appropriate for those headphones, as may be determined based on past settings, and the user can be granted at least some level of access to the device based upon using either of the headphones where the code is recognized by the device to be associated with the user.

In some embodiments, devices that already include or can provide unique codes do not necessarily have to include control modules or other such components. For example, a user might have a Bluetooth® headset, earpiece, or similar component that provides a unique identifier upon connection with a computing device, where that connection might be wired or wireless, using any appropriate connection channel or technology. Such an approach can enable at least some functionality on a computing device to be accessed when the computing device is in range of and/or connected with the headset, using the code for the connection. An advantage is that the user does not have to manually connect the components, as a wireless connection might be established automatically in at least some embodiments. Such an approach might have the disadvantage, however, that the functionality on the computing device might be accessible any time the computing device is within range of a specified component, such that the computing device might always be unlocked at work or at home, which might be undesirable for the user. At least some such components include buttons that can be used to input personal codes through beat patterns as discussed elsewhere herein.

In another example, a device such as a home wireless router or network access point can have a unique identifier and a limited range, such that at least some functionality on a computing device can be accessible and/or set when the computing device is within range of, and can detect, the wireless signal. The computing device does not necessarily have to establish a wireless connection with the router, for example, but at least has to be able to detect the signal and determine the code. Such an approach can enable functionality to be accessible on the device when the device is anywhere in the user's home, for example. Again, this might be undesirable for at least some users, particularly where multiple people live in the dwelling or often visit the dwelling, etc.

The ability to leverage the unique code of the control module and the personal code entered by the user for purposes of user authentication can reduce friction of the user to authenticate and provide the user's identity, and can be used for any situation where it is desirable to authenticate a user. In some embodiments, other information can be used to authenticate a user and/or provide access to certain data and/or functionality as well. For example, the location of a computing device (e.g., GPS coordinates, IP geo-location, or the proximity to a trusted SSID WiFi device) in connection with the code from the earbuds can be used to access certain location-based functionality. When leaving the proximity of a user's home network, for example, the device can ensure that the doors of the house are locked. When returning home, and thus back on the home network, a tune can play in the earbuds to remind the user to enter the personal code, which can cause the device to unlock one of the doors. The device can submit a user-authenticated request to not only unlock the door to the house, but can also cause the current song being played on the device to be played on the home stereo, cause the lights to be turned on, adjust home devices to personal settings or preferences, etc. When the user is able to be authenticated to perform actions through multi-factor authorization in such a convenient manner, a user can configure the device to perform a wide variety of actions and securely perform all sorts of automation around the user.

In some embodiments, a control module of a headphone accessory can also include a mechanism for encrypting and/or signing data when unlocked by the personal code. For example, a user wanting to access something secure (such as an option to unlock a front door) can cause a computing device to generate a request to open the door, and a device associated with the door can challenge the device to authenticate, such as by providing a public key and signing a request to the device. The device can send the challenge to the audio component, which can receive the challenge and prompt the user to enter the personal code. Upon receiving the personal code, the audio component can sign the request from the home with its secret key and encrypt the response with the public key from the home. The device can then send the signed request, which cannot be read by the device, to be received by the home device. The home device can receive the signed challenge response, and validate that the signed response matches the audio component that was previously paired. The home device can decrypt the challenge response successfully and then cause the door to be unlocked. In this manner, the audio component serves as a hardware security module (HSM) and provides a high degree of security to the user authentication because the device (even if compromised by malware) cannot read the response from the HSM (the encryption/signing of the response happens within the audio component).

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A headphone for an electronic device, the headphone comprising:
    a connector enabling the headphone to be connected to the electronic device in order to receive audio data from the electronic device;
    at least one speaker connected by at least one wire to the connector, the at least one speaker configured to provide an audio presentation of the audio data to a user wearing the headphone; and
    a control module including at least one button and a memory for storing an identifying code associated with a first control access level, the at least one button enabling the user to provide control input to the electronic device, the control module further configured to provide the identifying code to the electronic device in order to cause the electronic device to adjust at least one device setting corresponding to the first control access level, the at least one button further enabling the user to provide an input sequence associated with a second control access level configured to provide content access associated with the user.

2. The headphone of claim 1, wherein adjusting at least one device setting includes at least one of adjusting a volume setting, updating a current playlist on the electronic device, providing access to a set of functionality of the electronic device, or providing access to a subset of data stored by the electronic device.

3. The headphone of claim 1, further comprising:
    enabling the user to enter an input sequence into the control module to be provided to the electronic device, the input sequence corresponding to at least one of a melody, a portion of a song, or a beat pattern.

4. The headphone of claim 1, wherein each of the at least one button corresponds to a respective sound, and further comprising:
    enabling the user when wearing the headphone to hear the sounds of the input sequence corresponding to the pressing of the at least one button.

5. A computer-implemented method comprising:
    receiving an identifier from a headphone connected to an electronic device, the identifier being stored by the headphone;
    determining, via the electronic device, that the identifier corresponds to information associated with a first control access level;
    adjusting at least one setting of the electronic device corresponding to the first control access level;
    receiving, via the headphone, an input sequence associated with a second control access level; and
    providing content access to the electronic device corresponding to the second control access level.

6. The method of claim 5, wherein the second control access level provides at least one of access to all functionality of the electronic device or access to all data stored for a user of the electronic device.

7. The method of claim 5, wherein determining the input sequence and the identifier enables a multi-factor authentication of a user of the electronic device.

8. The method of claim 6, wherein at least some of the data is provided by a network storage service.

9. The method of claim 5, further comprising:
    storing at least one of the identifier or the input sequence on at least one of the electronic device or a remote system.

10. The method of claim 9, further comprising:
    contacting the remote system to determine that at least one of the identifier or the input sequence corresponds to data stored for a user of the electronic device.

11. The method of claim 5, wherein the input sequence corresponds to at least one of a melody, a portion of a song, or a beat pattern entered by a user into a control module of the headphone.

12. The method of claim 5, further comprising:
    unlocking the electronic device based at least in part upon determining that the identifier and the input sequence both correspond to data stored for a user.

13. The method of claim 5, wherein adjusting at least one setting of the electronic device includes at least one of adjusting a volume setting, updating a current playlist on the electronic device, providing access to a set of functionality of the electronic device, or providing access to a subset of data stored by the electronic device.

14. The method of claim 5, further comprising:
    determining the at least one setting to be adjusted based at least in part upon preference information stored for a user associated with the identifier.

15. A non-transitory computer-readable storage medium including instructions that, when executed by at least one processor of a computing system, cause the computing system to:
    receive a headphone code to an electronic device, the headphone code originating from a headphone connected to the electronic device;
    determine that the headphone code corresponds to information associated with a first control access level;

adjust at least one setting of the electronic device corresponding to the first control access level;

receive, via the headphone, an input sequence associated with a second control access level; and provide content access to the electronic device corresponding to the second control access level.

16. The non-transitory computer-readable storage medium of claim 15, wherein the instructions when executed further cause the computing system to:

receive the headphone code from a control module, the headphone code originating from the headphone when connected to the control module; and provide the control module to access a subset of data associated with a user when the headphone code is determined to be associated with the user.

17. The non-transitory computer-readable storage medium of claim 16, wherein the instructions when executed further cause the computing system to:

prevent the control module from accessing data associated with a user of the electronic device when the control module is disconnected from the electronic device.

18. The non-transitory computer-readable storage medium of claim 15, wherein the instructions when executed further cause the computing system to:

determine that the input sequence corresponds to data stored for a user.

19. The non-transitory computer-readable storage medium of claim 15, wherein the input sequence corresponds to at least one of a melody, a portion of a song, or a beat pattern entered by a user into a control module of the headphone, and wherein the instructions when executed further cause the computing system to:

provide sounds for the input sequence as entered into the control module.

20. The non-transitory computer-readable storage medium of claim 15, wherein the instructions when executed further cause the computing system to:

determine that the input sequence matches a sequence of button presses, and a relative timing of the sequence of button presses, for a code stored with personal information of a user.

21. The non-transitory computer-readable storage medium of claim 16, wherein the control module is a separate component connected between the headphone and the electronic device.

22. The non-transitory computer-readable storage medium of claim 15, wherein the instructions when executed further cause the computing system to:

receive location information from the electronic device; and enable the electronic device to activate functionality of at least one additional device based at least in part upon the received location information.

* * * * *